3,278,338
WATER-ACTIVATED BATTERY
William N. Carson, Jr., Schenectady, N.Y., and William
H. Fischer, Boulder, Colo., assignors to General Electric Company, a corporation of New York
No Drawing. Filed July 23, 1963, Ser. No. 296,905
2 Claims. (Cl. 136—100)

This invention relates generally to electrical batteries, and more particularly, to improved anode compositions for water-activated primary batteries. Specifically, this invention pertains to the use of certain magnesium alloys as the active anode compositions in water-activated batteries for generally improved performance.

Water-activated batteries employing a silver chloride or cuprous chloride cathode together with an anode of elemental magnesium are commercially available. The battery may be stored in a dry state and thereafter activated by immersion in an aqueous electrolyte or by passing electrolyte through a perforated housing member. While the electrochemical action may be initiated with distilled or tap water, better performance is obtained with an ionic electrolyte. The cell is generally characterized as capable of delivering large amounts of electrical power over a short period of time after activation, a high energy-to-weight or size ratio in the inactive state, and a short life once activation has been initiated. A common application for the device is marine use to supply power for torpedo propulsion systems, electric lamps, buoys, and the like. The battery may be activated simply during use by immersion in sea water.

A principal technical problem in a water-activated battery is polarization of the magnesium anode. One solution consists in using binary alloys of magnesium with mercury which polarize much less than elemental magnesium. Binary compositions exhibit undesirable "sloughing" action in use, however, which hinders their general acceptance. The particular sloughing action of a binary composition removes flakes of the alloy from the electrode prematurely, thereby representing loss of available material for the electrode reaction. Such flakes also may hinder free passage of electrolyte inside the cell and may provide a means of direct electrical contact between adjacent electrodes. It would be desirable to minimize such behavior in order to take advantage of the lower polarization exhibited by mercury-magnesium alloys generally.

It is one important object of the invention, therefore, to provide improved magnesium alloys for a water-activated battery.

It is still another important object of the invention to provide mercury-magnesium alloys exhibiting improved electrochemical behavior as well as ease of fabrication.

A still further object of the invention is to provide mercury-magnesium alloys capable of heat treatment for further improvement in the electrochemical behavior and nature of sloughing activity.

These and other important objects of the invention will be apparent from the following description illustrating in detail preferred anode compositions along with general preparation and methods whereby the electrochemical properties may be further enhanced. Where parts and percentages are mentioned hereinafter in the specification and claims, reference is made to parts and percentages by weight per 100 parts by weight of the total alloy unless otherwise specified.

Briefly, the improved mercury-magnesium alloys of the invention all contain 3–9 parts by weight aluminum, 0.5–10 parts by weight mercury, with the balance being predominantly magnesium. Compositions within the particular range specified exhibit less polarization in the battery than elemental magnesium and commercial alloys not containing mercury, together with less undesirable sloughing action than binary mercury-magnesium alloys. Small additions of still other alloying elements in the anode compositions provides still further optimization of the electrochemical behavior.

A preferred class of the general magnesium alloys above disclosed contains 5–9 parts by weight aluminum, 1–5 parts by weight mercury and the balance being predominantly magnesium. The relatively larger ratio of aluminum to mercury in this class of alloys compared to the general compositions depresses the undesirable flaking action at the anode without materially lowering the output voltage and higher current densities attainable in the battery. Incorporation of relatively minor amounts of zinc in the preferred class of alloys in the range from about 0.1–2 parts zinc per 100 parts of the alloy further enhances the desirable electrochemical behavior and physical properties of the composition for electrode construction. Likewise, relatively minor concentrations of manganese in the range approximately 0.1–2 parts manganese per 100 parts of the alloy promote the general improvements above described.

Another preferred class of magnesium alloys exhibiting the improved electrochemical behavior contains 3–9 parts by weight aluminum, 0.5–10 parts by weight mercury, 0.5–5 parts by weight cadmium, and the balance being predominantly magnesium. Again, relatively small concentrations of the zinc and manganese alloying elements in the compositions achieve the comparable benefits hereinbefore disclosed. The cadmium-containing alloys generally exhibit low sloughing tendency, with as good output voltage and current under load conditions as can be obtained with other alloys of the invention.

The alloys may be prepared by known metallurgical techniques for melting with the alloying elements being added before heating or added to the molten magnesium for usually better control of the final composition. Certain of the more volatile alloying elements such as mercury, cadmium, and zinc might be added in the pour ladle to further reduce vaporization losses. The alloys of the invention are suitably fabricated into a final electrode structure by any one of a number of known procedures including die casting, molding, ingot rolling, and the like. The alloys are also readily machineable subject to the usual safety precautions to be exhibited when machining magnesium metals generally.

Heat treatment of the alloys to provide an anneal develops even better physical properties for mechanical working and sloughing behavior. For the improvement, it is generally necessary to anneal the alloy up to about 700° F. for a sufficient period of time to dissolve the aluminum phase, thereafter cooling the alloy rapidly enough to maintain the aluminum phase in solution. Natural cooling in air has been found especially desirable in the designated annealing process. Air cooling generally produces smaller grain size in the alloy together with better adhesion between the metal grains than is obtained in quenched alloys. The air-cooled alloys can be expected to undergo less total sloughing with the portion which does slough forming fine precipitates in the electrolyte incapable of bridging the free space between adjacent electrodes. Still further improvement is obtained by heat-aging the alloy at low temperatures in the range from about 300–

400° F. for redistribution of the mercury phase in the composition. This treatment again enhances both output voltage and current under load in the aged alloy.

*Example 1*

A magnesium alloy containing approximately 6 parts aluminum, approximately 3 parts mercury and the balance magnesium was examined for electrochemical behavior by operation as the anode in a conventional water-activated battery employing a silver chloride cathode. Single anode and cathode elements were used in the form of flat sheets having dimensions of 1½ x 2 inches. The sheets were spaced apart at approximately 0.020 inch in a container for the electrolyte which included means for changing the electrolyte approximately 12 times per minute during the test. The particular electrolyte employed comprised a synthetic sea water composition containing 121 grams sodium chloride and 26 grams Epsom salts per gallon of water. The test was conducted at an electrolyte temperature of approximately 75° F. with a constant load of 0.22 ohm connected across the anode and cathode elements. The open circuit voltage of the cell measured 1.95 volts as compared to a value of 1.85 volts obtained under the same conditions with a commercial alloy containing 6 parts aluminum, 1 part zinc, 0.2 part manganese, and the balance magnesium. The average current density of 1.60 amperes per square inch measured in the presently embodied cell construction compares with a value of 1.45 amperes per square inch for the aforementioned commercial alloy. Observation of the present alloy during cell operation also witnessed significantly less sloughing than experienced with a binary mercury-magnesium alloy containing 3 parts mercury.

*Example 2*

Further improvement in cell output is obtained with larger mercury concentrations in the alloy without significant loss in desirable sloughing behavior. More particularly, a magnesium alloy containing approximately 6 parts aluminum, approximately 5 parts mercury, and approximately 0.2 part manganese exhibited an open circuit voltage of 1.93 volts and a current density of 1.64 amperes per square inch at the aforementioned conditions. Only moderate sloughing of the alloy was observed compared to the relatively heavy sloughing noted for a binary mercury-magnesium alloy containing 3 parts mercury.

*Example 3*

Addition of 3 parts mercury in the conventional alloy disclosed in Example 1 results in general improvement of cell output without sacrifice of the desirable sloughing behavior exhibited by the original composition. Accordingly, an alloy containing approximately 6 parts aluminum, approximately 3 parts mercury, approximately 1 part zinc, approximately 0.2 part manganese, and the balance magnesium measured 1.88 volts on open circuit and 1.63 amperes per square inch at the aforementioned test cell conditions.

*Example 4*

Further increase in concentration of mercury in the alloy composition of Example 3 produces still greater cell output. More particularly, an alloy containing approximately 6 parts aluminum, approximately 5 parts mercury, approximately 1 part zinc, approximately 0.2 part manganese, and the balance magnesium produced an open circuit voltage of 1.97 volts and an average density of 1.66 amperes per square inch at the aforementioned test conditions.

*Example 5*

Other preferred alloys of the invention contain small but effective concentrations of cadmium. A representative composition comprises approximately 6 parts aluminum, approximately 5 parts mercury, approximately 2 parts cadmium, approximately 0.2 part manganese, and the balance magnesium. The alloy was observed to exhibit the same desirable sloughing behavior in the test cell along with an open circuit voltage of 1.89 volts and an average current density of 1.64 amperes per square inch.

*Examples 6-11*

Still other alloys exhibiting improved behavior as the active anode composition for a sea water battery are listed in tabular form below. The alloys were fabricated into sheet electrodes for test cell performance at the same conditions previously recited. Cell output measurements appear in the table for the individual alloy compositions.

TABLE

| Example | Alloy composition (parts by weight alloying elements per 100 parts by weight alloy with balance being magnesium) | Open circuit voltage | Average current density at 0.22 ohm load (amps/in.²) |
|---|---|---|---|
| 6 | 6 aluminum<br>8 mercury<br>0.2 manganese | 1.94 | |
| 7 | 8 aluminum<br>7 mercury<br>0.2 manganese | 1.96 | 1.71 |
| 8 | 8 aluminum<br>5 mercury<br>0.2 manganese | 1.88 | 1.61 |
| 9 | 7 aluminum<br>6 mercury<br>0.2 manganese | 1.95 | 1.73 |
| 10 | 3 aluminum<br>3 mercury | 1.85 | 1.45 |
| 11 | 6 aluminum<br>5 mercury<br>5 cadmium<br>0.2 manganese | 1.84 | 1.57 |

Alloys of the invention generally provide the further advantage of lower polarization after heat treatment as distinct from elemental magnesium and conventional alloys now used for the anode composition. Many of the present alloys are also far less brittle than the mentioned materials permitting easier fabrication of electrode structures by ordinary mechanical deformation. The present ternary aluminum-mercury magnesium alloys are rolled into shape more easily even than a binary alloy containing as much as 12 percent mercury.

From the foregoing description, it will be apparent that improved magnesium alloys for construction of an anode in a water-activated battery have been provided. It is not desired to limit the invention to the preferred embodiments above shown, however, since it will be obvious to those skilled in the art that still further alloying elements might be added to the disclosed compositions in minor concentration. For example, the addition of alkali and alkaline earth elements higher than magnesium in the electromotive series is contemplated for still higher electrode potentials. It is intended to limit the present invention, therefore, only to the scope of the following claims.

What we claim as new and desire to secure by Letters Patent of the United States is:

1. In a water-activated battery which comprises housing means containing a cathode member employing a chloride compound selected from the class consisting of silver chloride and cuprous chloride operatively associated with an anode member comprising a magnesium alloy for activation of the battery with introduction of aqueous electrolyte, the improvement in combination therewith which comprises employing a magnesium alloy containing 3-9 parts by weight aluminum, 0.5-10 parts by weight mercury, and the balance being magnesium per 100 parts by weight alloy.

2. In a water-activated battery which comprises housing means containing a cathode member employing a chloride compound selected from the class consisting of silver chloride and cuprous chloride operatively associated with an anode member comprising a magnesium alloy for activation of the battery with introduction of aqueous electrolyte, the improvement in combination therewith which comprises employing a magnesium alloy containing 3–9 parts by weight aluminum, 0.5–10 parts by weight cadmium and 0.1–2 parts of an element selected from the class consisting of zinc, manganese and mixtures thereof, and the balance being magnesium per 100 parts by weight alloy.

References Cited by the Examiner

UNITED STATES PATENTS

| | | | |
|---|---|---|---|
| 1,957,934 | 5/1934 | Brooks | 75—168 |
| 2,124,553 | 7/1938 | Gann | 75—168 |
| 2,226,549 | 12/1940 | Burkhardt et al. | 75—168 |
| 2,726,279 | 12/1955 | Gobat | 136—120 |
| 3,005,864 | 10/1961 | Sharpe | 136—120 |

OTHER REFERENCES

Ser. No. 303,611 (abandoned), Burkhardt et al. (A.P.C.), published May 1943.

WINSTON A. DOUGLAS, *Primary Examiner.*

ALLEN B. CURTIS, *Examiner.*

A. SKAPARS, *Assistant Examiner.*